Figure 5:
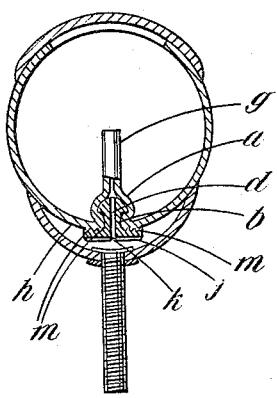

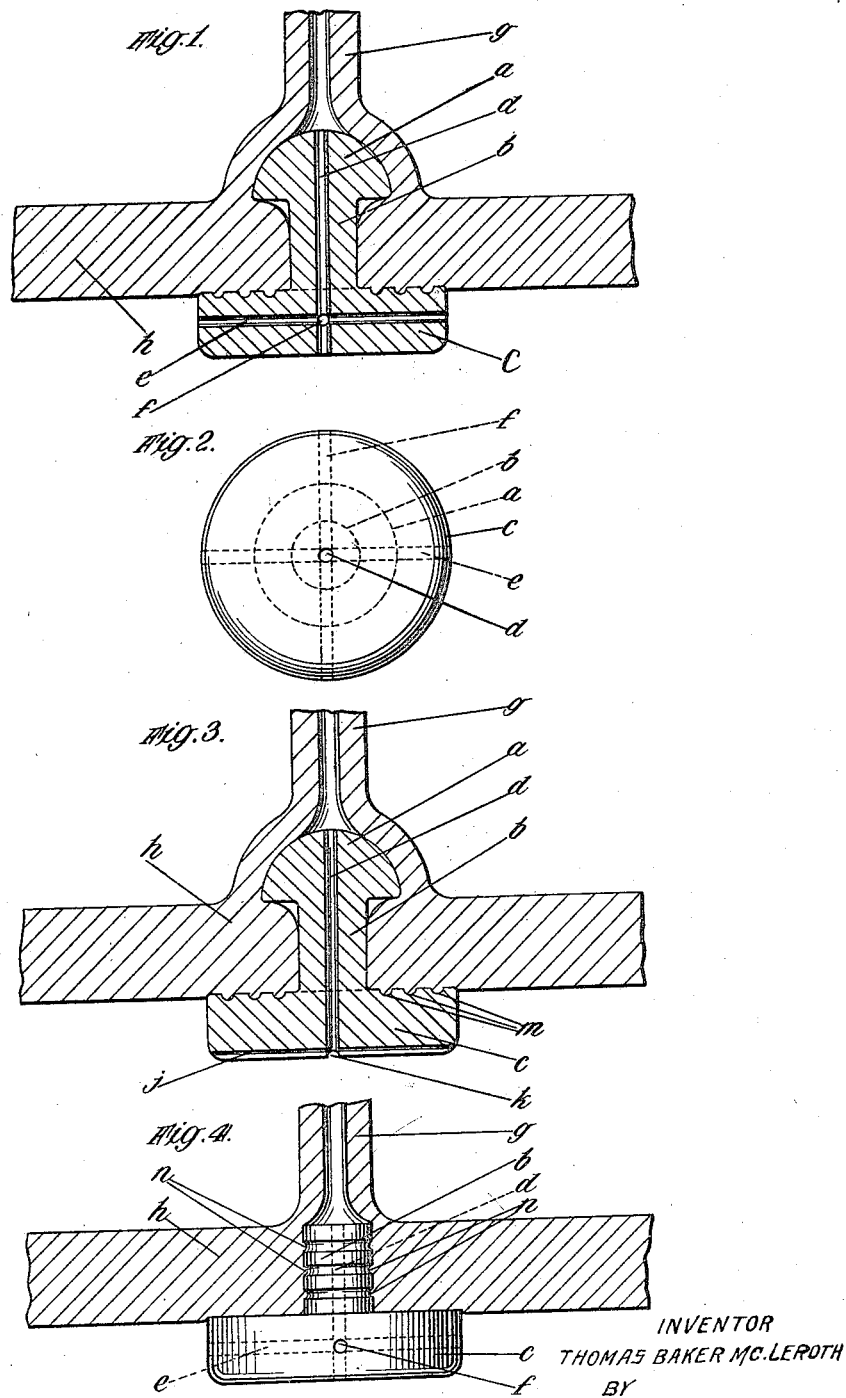

Feb. 26, 1924.

T. B. McLEROTH 1,484,951

AIR TUBE FOR PNEUMATIC TIRES

Filed July 6, 1922    2 Sheets-Sheet 2

INVENTOR
THOMAS BAKER MC.LEROTH
BY
ATTORNEYS

Patented Feb. 26, 1924.

1,484,951

UNITED STATES PATENT OFFICE.

THOMAS BAKER McLEROTH, OF HADLEY WOOD, ENGLAND.

AIR TUBE FOR PNEUMATIC TIRES.

Application filed July 6, 1922. Serial No. 573,233.

*To all whom it may concern:*

Be it known that I, THOMAS BAKER MC-LEROTH, of "Eastburn," The Crescent, Hadley Wood, in the county of Middlesex, England, a British subject, have invented certain new and useful Improvements in or Relating to Air Tubes for Pneumatic Tires, of which the following is a specification.

This invention relates to an air tube for a pneumatic tire, of the kind comprising a plurality of sections or compartments so arranged that the puncturing of one section or compartment will not affect materially the efficiency of the tire as a whole.

Air tubes of this kind and moulds for the production thereof are described in the specifications accompanying my prior Letters Patents Nos. 1,459,544 and 1,379,929 and my application for Letters Patent Serial No. 558,635, and in such tubes a passage called the feed passage runs around the inner periphery of the tube and communicates with each of the sections or compartments by way of a valveless rubber feed tube, projecting into each compartment. The object of the present invention is to facilitate the manufacture of such air tubes.

According to the present invention a separate element preferably somewhat in the form of a collar stud (hereinafter called a "stud") with or without a head is introduced through an aperture in the appropriate wall, the stud being formed with a fine substantially axial passage communicating with a passage or passages arranged transversely of the base of the stud, i. e., that end thereof which will lie within the feed passage when the tube is completed, and debouching at the periphery thereof.

The stud, which may be made of vulcanite, compressed fibre, metal or like substance, may be formed with a rounded head, a neck corresponding with the thickness of the wall to be traversed and an enlarged base, a fine passage being arranged axially through the head, neck and base, and two fine passages being arranged diametrically through the base so as to intersect one another and communicate with the axial passage whilst the upper surface of the base may be concentrically fluted, ribbed or grooved or otherwise roughened and the neck of the stud may be similarly formed to facilitate adhesion to the wall.

The studs may be inserted through apertures in the wall before or after vulcanization of the tube according to the method which is adopted for the manufacture of the tube. For instance when the tube is made in a straight length with or without an integral feed passage the studs may be introduced into the moulds before vulcanization, and be employed in combination with the valveless rubber feed tubes, or the studs may be introduced after vulcanization of the air tube into the valveless rubber feed tubes.

Similarly the studs may be vulcanized or introduced into a separately manufactured feed passage, or they may be vulcanized to or passed through a strip of rubber employed to close the core-withdrawing apertures, when the latter are at the inner periphery of the tube, the feed passage being formed by an additional strip of rubber united at its edges only with the air tube.

If desired grooves intersecting one another and communicating with the axial passage through the stud may be formed in the surface of the base of the stud instead of passages therethrough. The studs may be turned, moulded, pressed or otherwise produced and the apertures therethrough or grooves therein may be formed simultaneously or by separate operations.

Figure 6:
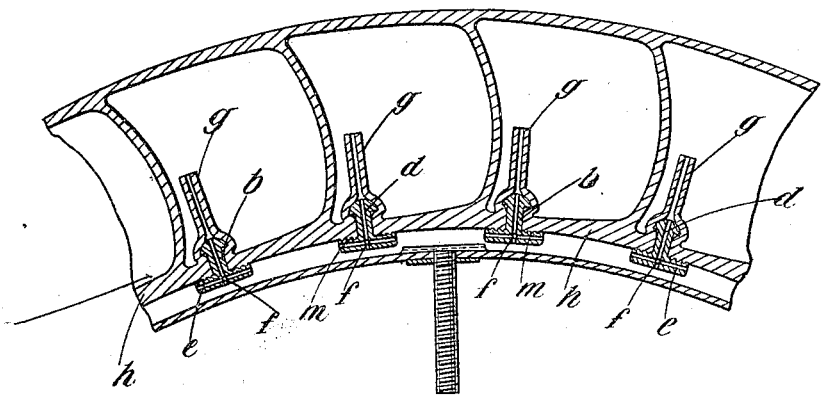

The accompanying drawings illustrate various forms of the invention on an enlarged scale, Figure 1 being a central section of one form of stud shown in position in a portion of an air tube, Figure 2 an inverted plan of the stud alone, Figure 3 a view similar to Figure 1, showing a modified form of stud, and Figure 4 an elevation of a further modified form of stud, a portion of an air tube being shown in section. Figures 5 and 6 are respectively a cross-section of one form of air tube as described in the specification of Letters Patent No. 1,459,544 and a longitudinal section of part of one form of air tube as described in the specification of my prior application, Serial No. 558,635, with the present invention incorporated therein.

The form of stud shown in Figures 1 and 2 has a substantially hemi-spherical head *a*, a neck *b* and an enlarged base *c*, a fine passage *d* being arranged axially through the head *a*, neck *b* and base *c*, and two transverse channels formed by fine passages *e*, *f* being arranged diametrically through the base *c* so as to intersect one another and communicate with the passage *d*. The stud is shown in position in one form of the valveless rubber feed tube *g* above mentioned projecting from a wall *h* and the neck *b* is made of such length that the head *a* enters the tube *g* after being passed through the wall *h* and by engagement with said tube and the inner side of the wall *h* tends to prevent displacement of the stud.

Figure 3 shows how intersecting grooves *j*, *k*, as transverse channels formed in the surface of the base *c*, may be substituted for the intersecting and communicating passages shown in Figures 1 and 2. Whether the transverse channels be formed as through passages (Figs. 1, 2 and 4) or as grooves (Fig. 3), they will prevent a collapse of the common feed passage from permitting a wall of said passage to close the aperture or duct leading from such passage through the stud to a section or compartment of the tire. Figures 1 and 3 also show how the upper surface of the base *c* may be grooved concentrically as at *m* to facilitate adhesion to the surface of the wall *h*.

Figure 4 illustrates a form of the invention in which the head *a* is dispensed with and in which the neck *b* is grooved at intervals along its length as at *n* to facilitate adhesion to the wall of the aperture through the wall *h* and tube *g*.

It is to be understood that the arrangements of the passages *e*, *f* grooves *j*, *k*, *m* and *n* are not confined to the individual forms of the invention in connection with which they are described but that they may be applied to other forms alone or in combination, thus, for instance, the form of the invention illustrated by Figure 1 may have its neck *b* formed with grooves *n*, or further fluting, ribs or other roughening may be substituted for the grooves *n*.

The passage *d* may, if desired, be enlarged for the greater part of its length so as to leave a short length of fine passages, e. g., where it opens at the top of the head *a*.

Figs. 5 and 6 illustrate the employment of studs according to the present invention in air tubes as described and illustrated in the prior patents and application mentioned hereinbefore.

I claim:—

1. For use in an air tube of the kind hereinbefore set forth for a pneumatic tire, a stud having a head, a neck, and a base, said head being formed with a fine substantially axial passage and said base being formed with a channel arranged transversely thereof debouching at the periphery thereof and communicating with the passage in said head, substantially as described.

2. For use in an air tube of the kind hereinbefore set forth for a pneumatic tire, a stud having a neck and a base, said neck being formed with a fine substantially axial passage and said base being formed with a channel arranged transversely thereof debouching at the periphery thereof and communicating with the passage in said neck, substantially as described.

3. For use in an air tube of the kind hereinbefore set forth for a pneumatic tire, a stud having a neck and a base, said neck being formed with a substantially axial passage and said base being formed with transverse channels communicating with said passage and intersecting one another, said channels debouching at the periphery of the base.

THOMAS BAKER McLEROTH.